United States Patent
Li et al.

(10) Patent No.: US 10,325,108 B2
(45) Date of Patent: Jun. 18, 2019

(54) METHOD AND APPARATUS FOR RANGE BASED CHECKPOINTS IN A STORAGE DEVICE

(71) Applicant: Intel Corporation, Santa Clara, CA (US)

(72) Inventors: Xiaoning Li, Hillsboro, OR (US); Ravi L. Sahita, Portland, OR (US); Benjamin W. Boyer, Hillsboro, OR (US); Sanjeev Trika, Portland, OR (US); Adrian Pearson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/394,958

(22) Filed: Dec. 30, 2016

(65) Prior Publication Data

US 2018/0189508 A1    Jul. 5, 2018

(51) Int. Cl.
| | |
|---|---|
| *G06F 21/62* | (2013.01) |
| *G06F 3/06* | (2006.01) |
| *G06F 21/52* | (2013.01) |
| *G06F 21/78* | (2013.01) |

(52) U.S. Cl.
CPC .......... *G06F 21/6218* (2013.01); *G06F 3/062* (2013.01); *G06F 3/0659* (2013.01); *G06F 3/0665* (2013.01); *G06F 3/0673* (2013.01); *G06F 21/52* (2013.01); *G06F 21/78* (2013.01)

(58) Field of Classification Search
CPC .... G06F 21/6218; G06F 21/50; G06F 3/0673; G06F 3/0659; G06F 3/062; G06F 3/0665; G06F 21/78; G06F 21/52
See application file for complete search history.

(56) References Cited

U.S. PATENT DOCUMENTS

| | | | | |
|---|---|---|---|---|
| 7,158,991 | B2 * | 1/2007 | Kekre | .................. G06F 3/0605 |
| 7,784,097 | B1 * | 8/2010 | Stolfo | ................ H04L 63/1408 |
| | | | | 380/59 |
| 8,474,032 | B2 | 6/2013 | Fetik | |
| 8,499,349 | B1 * | 7/2013 | Cruz | ..................... G06F 21/568 |
| | | | | 726/24 |
| 2003/0204719 | A1 * | 10/2003 | Ben-Itzhak | ............. G06F 21/51 |
| | | | | 713/152 |
| 2006/0026319 | A1 * | 2/2006 | Rothman | ............ G06F 11/1469 |
| | | | | 710/100 |
| 2006/0117216 | A1 * | 6/2006 | Ikeuchi | ............... G06F 11/0727 |
| | | | | 714/6.2 |

(Continued)

OTHER PUBLICATIONS

Barker, Ian, "How storage can help fight malware [Q&A]," Nov. 16, 2016, [retrieved from Internet] URL: https://betanews.com/2016/11/16/storage-fighting-malware/, 3 pages.

(Continued)

*Primary Examiner* — Matthew Smithers
(74) *Attorney, Agent, or Firm* — Alliance, IP, LLC

(57) ABSTRACT

In one embodiment, a system comprises a processor to, in response to a determination that a write command is suspect, identify a logical address associated with the write command; and send a checkpoint command identifying the logical address to a storage device to preserve data stored in the storage device at a physical address associated with the logical address.

19 Claims, 7 Drawing Sheets

(56) References Cited

U.S. PATENT DOCUMENTS

| | | | |
|---|---|---|---|
| 2006/0227585 A1* | 10/2006 | Tomoda | G06F 11/1471 365/36 |
| 2007/0271422 A1* | 11/2007 | Osaki | G06F 21/568 711/154 |
| 2008/0216073 A1* | 9/2008 | Yates | G06F 9/30174 718/100 |
| 2009/0198932 A1* | 8/2009 | Beaver | G06F 21/79 711/163 |
| 2009/0241195 A1* | 9/2009 | Chung | G06F 21/566 726/24 |
| 2009/0307452 A1* | 12/2009 | Hahn | G06F 21/57 711/164 |
| 2010/0077138 A1* | 3/2010 | Bauernfeind | G06F 3/062 711/104 |
| 2012/0173794 A1* | 7/2012 | Royer, Jr. | G06F 11/1451 711/103 |
| 2013/0167235 A1* | 6/2013 | Kapoor | G06F 21/56 726/24 |
| 2013/0185555 A1* | 7/2013 | Wang | G06F 17/30117 713/165 |
| 2013/0291110 A1* | 10/2013 | Thadikaran | G06F 21/78 726/23 |
| 2014/0310880 A1* | 10/2014 | Wyatt | A61G 7/0525 5/709 |
| 2015/0220385 A1* | 8/2015 | Wood | G06F 11/108 714/6.24 |
| 2015/0227462 A1 | 8/2015 | Grocutt | |
| 2016/0026408 A1* | 1/2016 | Peterson | G06F 3/0644 711/103 |
| 2016/0149937 A1* | 5/2016 | Katmor | H04L 69/161 726/23 |
| 2016/0283160 A1* | 9/2016 | Trika | G06F 3/0638 |
| 2016/0349996 A1 | 12/2016 | Gair et al. | |

OTHER PUBLICATIONS

International Search Report and Written Opinion for PCT Application No. PCT/US2017/062165 dated Mar. 22, 2018; 12 pages.

* cited by examiner

METHOD AND APPARATUS FOR RANGE BASED CHECKPOINTS IN A STORAGE DEVICE

FIELD

The present disclosure relates in general to the field of computer development, and more specifically, to protecting critical data stored in a storage device from malware.

BACKGROUND

A computer system may include one or more central processing units (CPUs) which may communicate with one or more storage devices. A CPU may include a processor to execute an operating system and/or other software applications that utilize a storage device coupled to the CPU. The software applications may write data to and read data from the storage device.

Data in a storage device may be backed up at different points-in-time to allow restoration of data to a saved point-in-time as part of a process referred to as checkpointing. Operating system checkpointing involves the operating system storing prior versions of updated data to create a checkpoint to allow the user to return the state of the data to that checkpoint. However, operating system checkpointing is susceptible to attacks by malware on the operating system and application files that may corrupt the checkpointed data and prevent the user from restoring data to a point before the malware was installed. Further, operating system based checkpointing is susceptible to other software interference and anti-virus programs may need to be disabled for checkpointing to work properly. Virtual Machine checkpointing involves a virtual machine monitoring for changes and storing prior versions of updated data to allow restoring the state of the virtual machine to a checkpoint time. Virtual machine checkpointing is also susceptible to malware attacks. System backups comprise a backup of all the data in a drive as of a checkpoint time to a different partition on the storage device or another storage device. System backups may run on the host system and consume significant host resources, which may result in performance degradation at the host system. Further, host based system backups are often slow and require substantial time to backup and restore.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
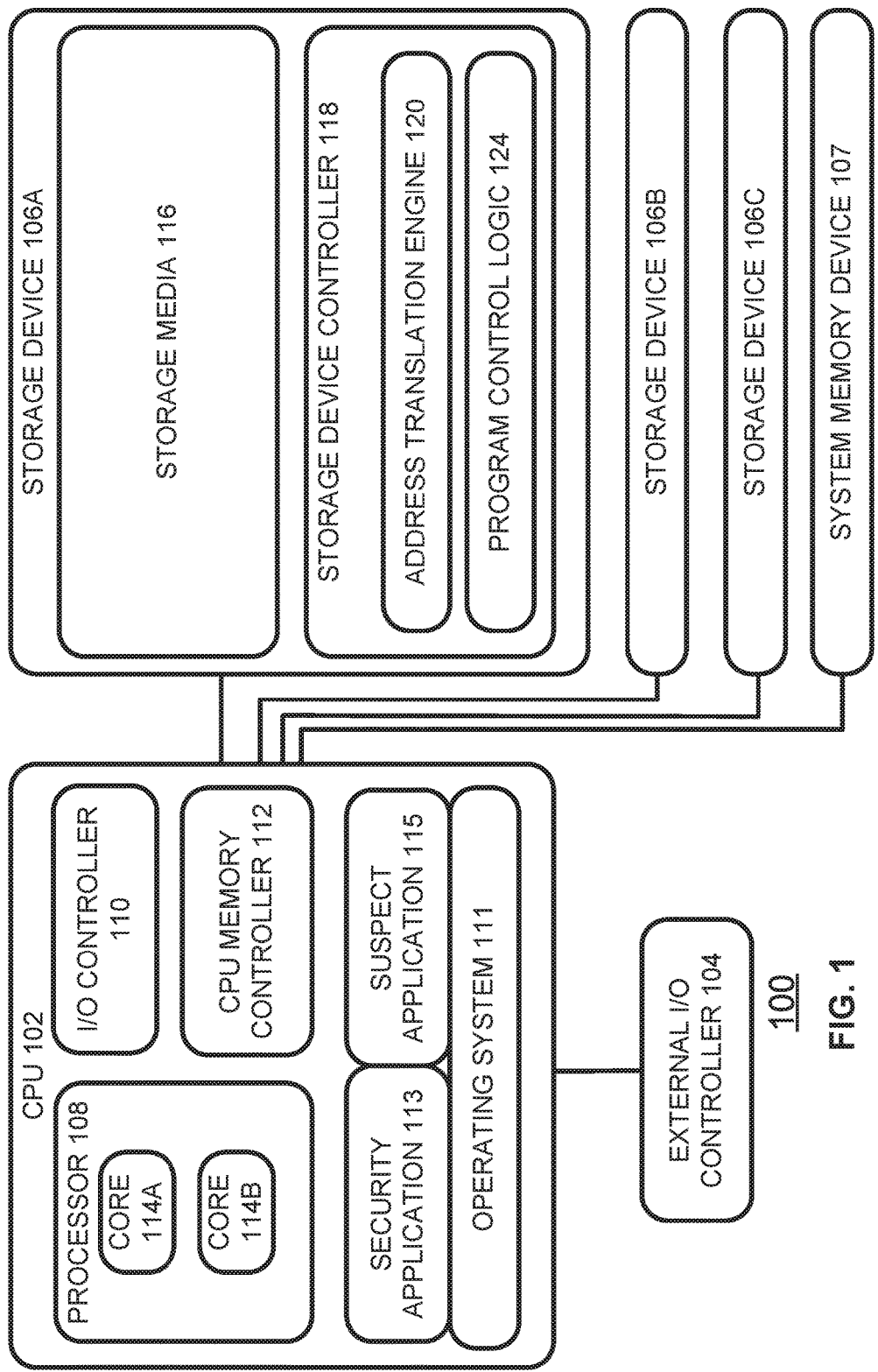
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a plurality of storage devices 106A, 106B, and 106C (storage devices 106B and 106C may perform in similar manners to storage device 106A and/or may have any suitable characteristics of storage device 106A), and system memory device 107. During operation, data may be transferred between storage device 106A or system memory device 107 and the CPU 102. In various embodiments, particular data operations (e.g., read and write operations) involving a storage device 106A or system memory device 107 may be issued by an operating system 111 and/or other software applications (e.g., security application 113 or suspect application 115) executed by processor 108.

Various embodiments of the present disclosure provide for range based checkpoints on a solid state drive (SSD), Hard Disk Drive (HDD), Non-volatile memory Dual in line Module (NVDIMM), or other storage device. Malware (especially viruses and ransomware) is a fast-growing and substantial threat to computer systems. In some instances, an application (e.g., suspect application 115) may be downloaded onto a computer system and may interact with a storage device (e.g., by writing to and reading from the storage device). A security application 113 executed by the computer system may be able to detect a newly installed application as malware and prevent the execution of the application and/or notify a user of the computer system of such a detection. However, in some instances a security application may not be able to immediately detect whether an application is malware or not (such an application for which trustworthiness has not yet been determined may be referred to herein as a "suspect application"). In such instances, the security application may allow execution of the suspect application 115, which may result in the suspect application 115 issuing write commands to storage device 106A. The security application 113 may later determine that the suspect application 115 is malware and may block further execution of the suspect application. However, the execution of malware of the suspect application 115 may have resulted in unwanted changes to the data stored on the storage device (e.g., the addition of unwanted files or programs, the encryption of existing files, the deletion of files, or other unwanted changes).

In order to prevent such damage from affecting operation of the computer system, various embodiments of the present disclosure provide range based checkpointing of data. When a suspect application 115 issues a write command, a range of logical addresses (e.g. logical block addresses) that are targeted by the write command are determined. The logical addresses are checkpointed such that the data stored in these logical blocks is preserved in respective physical locations of the storage device 106A while subsequent writes to these logical addresses (e.g., made by the suspect application) are stored in separate physical locations on the storage device. If the suspect application 115 is later determined to contain malware, the modified data may be deleted and the data may be restored to its state at the time of the checkpoint. If instead the suspect application 115 is later determined to be a trusted application, the changes made by the application may be preserved and the original checkpointed data may be deleted.

By limiting the checkpointing to specific ranges of logical addresses (e.g., the logical block addresses associated with write commands issued by suspect applications), various embodiments of the present disclosure may provide efficient checkpointing using much less space than other checkpointing solutions that checkpoint an entire drive. Various embodiments of the present disclosure also provide advantages over other incomplete checkpointing solutions, such as solutions that limit the restoration of data for only the last N unique logical addresses written to and/or solutions that destroy non-suspect file-updates. Thus, various embodiments of the present disclosure may allow a security application 113 to selectively checkpoint files or other data groupings associated with suspect write operations (as opposed to an entire SSD or writes to the last N unique logical addresses), selectively restore the files or other data groupings, and preserve updates to the latest user data that is not a malware target without utilizing extra storage space to checkpoint such data.

CPU 102 comprises a processor 108, such as a microprocessor, an embedded processor, a DSP, a network processor, a handheld processor, an application processor, a co-processor, an SOC, or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise an audio/video (A/V) device controller such as a graphics accelerator or audio controller; a data storage device controller, such as a SSD, HDD, NVDIMM, or optical storage disk controller; a wireless transceiver; a network processor; a network interface controller; or a controller for another input device such as a monitor, printer, mouse, keyboard, or scanner; or other suitable device. In a particular embodiment, an I/O device may comprise storage device controller 118 of storage device 106A coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106A to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other device) of computer system 100.

In various embodiments, a system memory device 107 may include a memory comprising any number of memory modules, a memory device controller, and other supporting logic (not shown). A memory module may include non-volatile memory and/or volatile memory. Non-volatile memory is a storage medium that does not require power to maintain the state of data stored by the medium. Nonlimiting examples of nonvolatile memory may include any or a combination of: planar or 3 Dimensional (3D) NAND flash memory or NOR flash memory, 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 107 that is volatile memory can comply with JEDEC standards including but not limited to Double Data Rate (DDR) standards, e.g., DDR3, 4, and 5, or Low Power DDR4 (LPDDR4) as well as emerging standards.

A storage device 106A may store any suitable data, such as data used by processor 108 to provide functionality of computer system 100. For example, data associated with programs that are executed or files accessed by cores 114A and 114B may be stored in storage device 106A. In various embodiments, a storage device 106A may store persistent data (e.g., a user's files or software application code) that maintains its state even after power to the storage device 106A is removed. A storage device 106A may be dedicated to CPU 102 or shared with other devices (e.g., another CPU or other device) of computer system 100.

In the embodiment depicted, storage device 106A includes a storage device controller 118 and storage media 116. Storage media 116 includes a plurality of memory cells that are each operable to store one or more bits of data. The cells of storage media 116 may be arranged in any suitable fashion, such as in rows (e.g., wordlines) and columns (e.g., bitlines), three dimensional structures, sectors, or other manner. In various embodiments, the cells may be logically grouped into banks, blocks, subblocks, wordlines, pages, frames, bytes, or other suitable groups.

In various embodiments, storage device 106A may comprise a solid state drive; a hard disk drive; a memory card; a Universal Serial Bus (USB) flash drive; a Non-Volatile Dual In-line Memory Module (NVDIMM); storage integrated within a device such as a smartphone, camera, or media player; or other suitable mass storage device. In a particular embodiment in which storage device 106A is a solid state drive, storage media 116 comprises NAND flash memory. In another particular embodiment in which storage device 106A is a solid state drive, storage media 116 comprises 3D crosspoint memory. However, storage media 116 may include any of the volatile or non-volatile memories listed above or other suitable memory. In particular embodiments, storage media 116 includes non-volatile memory. In particular embodiments, storage media 116 with non-volatile memory may comply with one or more standards for non-volatile memory promulgated by the Joint Electron Device Engineering Council (JEDEC), such as JESD218, JESD219, JESD220-1, JESD220C, JESD223C, JESD223-1, or other suitable standard (the JEDEC standards cited herein are available at www.jedec.org). In particular embodiments, the storage device comprises NAND flash memory that complies with one or more portions of a standard promulgated by JEDEC for SDRAM memory, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces. For example, a storage device 106A comprising NAND flash memory may receive a command that has a format compliant with a DDR-based standard and may translate the command into one or more commands that are compatible with NAND flash memory of the storage device 106A. Similarly, the storage device 106A may format results from operations performed on the NAND flash memory into a format that is compliant with a DDR-based standard before transmitting the results to the CPU 102.

Storage device 106A may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106A may also include a communication interface to communicate with CPU memory controller 112 or I/O controller 110 in accordance with any suitable logical device interface specification such as NVMe, AHCI, or other suitable specification. In particular embodiments, storage device 106A may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to storage media 116, and provide data associated with the requests to CPU 102 (e.g., via CPU memory controller 112 or I/O controller 110). Controller 118 may also be operable to detect and/or correct errors encountered during memory operation. In an embodiment, controller 118 also tracks the number of times particular cells (or logical groupings of cells) have been written to in order to perform wear leveling and/or to detect when cells are nearing an estimated number of times they may be reliably written to. In performing wear leveling, the storage device controller 118 may evenly spread out write operations among blocks of the memory of storage media 116 such that particular blocks are not written to more than other blocks. In various embodiments, controller 118 may also monitor various characteristics of the storage device 106A such as the temperature or voltage and report associated statistics to the CPU 102. Storage device controller 118 can be implemented on the same circuit board or device as storage media 116 or on a different circuit board, or device. For example, in some environments, storage device controller 118 may be a centralized storage controller that manages memory operations for multiple different storage media 116 (which could each be of the same type of memory or could be of different types) of computer system 100 (and thus could provide storage device controller functionality described herein to any of the memories to which it is coupled).

In various embodiments, the storage device 106A also includes an address translation engine 120. In the depicted embodiment, the address translation engine 120 is shown as part of the storage device controller 118, although in various embodiments, the address translation engine 120 may be separate from the storage device controller 118 and communicably coupled to the storage device controller 118. In various embodiments, the address translation engine 120 may be integrated on the same chip or package as the storage device controller 118 or on a different chip or package.

In various embodiments, address translation engine 120 may include logic (e.g., one or more logic-to-physical (L2P) address tables) to store and update a mapping between a logical address space (e.g., an address space visible to a computing host coupled to the storage device 106A) and the physical address space of the storage media 116 of the storage device 106A (which may or may not be exposed to the computing host). The logical address space may expose a plurality of logical groups of data which are physically stored on corresponding physical groups of memory addressable, by the storage device 106A, through the physical address space of the storage device 106A. A physical address of the physical address space may comprise any suitable information identifying a physical memory location (e.g., a location within storage media 116) of the storage device 106A, such as an identifier of the storage device 106A on which the physical memory location is located, an identifier of a module (such as a package, chip, memory array, disk or other module) of the storage media 116 on which the physical memory location is located, one or more pages of the physical memory location, one or more sub-blocks of the physical memory location, one or more wordlines of the physical memory location, one or more bitlines of the physical memory location, one or more disk sectors of the physical memory location, and/or other suitable identifiers or encodings thereof. In general, a logical address and a corresponding physical address have the same granularity. For example, a logical address comprising a logical block address (LBA) may correspond to a physical address of a physical block of memory of the storage device 106A. In a particular embodiment a logical address specifies the minimum amount of data that may be referenced using a write command. In various example, a logical address may refer to a block size of 512 bytes, 1 Kilobyte (KB), 2 KB, 4 KB, or other suitable block size.

The address translation engine 120 or other portion of storage device 106A may include any suitable memory type for storing logical to physical mapping structures and related information and any suitable logic for changing values stored in the logical to physical mapping structures (e.g., in response to a request from the storage device controller 118) and reading values from the logical to physical mapping structures (e.g., to provide the values to the storage device controller 118 for use in memory operations).

Storage media for the logical to physical mapping structures and other information may be included within the address translation engine 120 and/or storage device controller 118 or may be communicably coupled to the address translation engine and/or storage device controller. In various embodiments, storage media for the logical to physical mapping structures and other information may be integrated on the same package or chip as the storage device controller 118 and/or address translation engine 120 or may be implemented on a separate package or chip.

In various embodiments, the address translation engine 120 and/or storage device controller 118 may provide wear leveling through management of the address mappings of the logical to physical mapping structures and other information. In particular embodiments, the address translation engine 120 and/or storage device controller 118 may also prevent the use of bad memory cells (or logical grouping of cells) by not allowing physical addresses for the bad cells (or logical grouping of cells) to be mapped to the logical address space.

Figure 2:
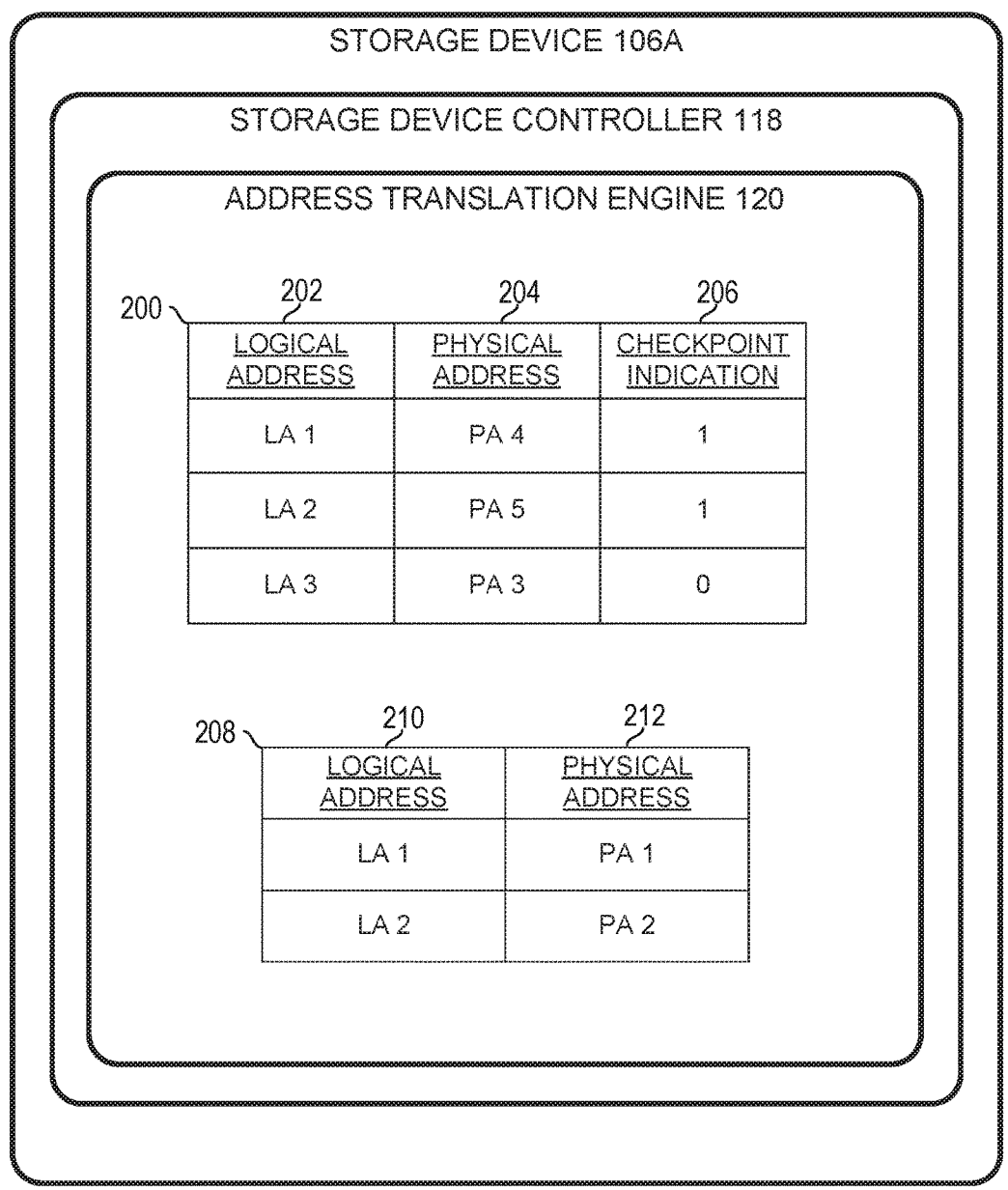
FIG. 2 illustrates an example logical-to-physical (L2P) address table and checkpoint L2P address table in accordance with certain embodiments.

FIG. 2 illustrates an example L2P address table 200 and checkpoint L2P address table 208 in accordance with certain embodiments. L2P address table 200 and checkpoint L2P address table 208 represent possible implementations of the logical to physical mapping structures discussed above, though other embodiments may utilize any suitable structures storing such mapping information.

In the illustrated embodiment, L2P address table 200 includes three entries and checkpoint L2P address table 208 includes two entries, though an L2P address table may have any suitable number of entries spanning the logical address space provided by the storage device 106A and a checkpoint L2P address table may include any suitable number of entries for a subset of the logical addresses included in a corresponding L2P address table.

Each entry of the L2P address table 200 includes a logical address 202, a physical address 204, and a checkpoint indication 206. The logical address of an entry is mapped to the physical address of the entry. That is, the physical address represents the address of the storage media 116 that is to be written to or read from when a host (e.g., CPU 102) sends a write or a read command referencing the logical address. The checkpoint indication 206 of each entry represents whether the particular logical address has been checkpointed. In other embodiments in which a particular logical address may be checkpointed multiple times (wherein a copy of the data referred to by the logical address at the time of each checkpoint is stored in separate physical locations by the storage device), checkpoint indication 206 may alternatively or additionally include information regarding one or more checkpoint versions in order to allow determination of a physical address storing the data as of a particular checkpoint.

Checkpoint L2P address table 208 includes entries for logical addresses that have been checkpointed. Each entry of checkpoint L2P address table 208 includes a logical address that has been checkpointed and a corresponding physical address that represents the location of the data that was referenced by the logical address at the time of the checkpoint (e.g., the physical address that was mapped to the logical address in the L2P address table 200 at the time of the checkpoint). In various embodiments, the entries may also include an indication of a checkpoint version (e.g., when data may be checkpointed multiple times). Thus, checkpoint L2P address table 208 may include an entry for each checkpointed version of a logical address, where each of these entries would include the same logical address, but would each include different physical addresses and version numbers. Alternatively, separate checkpoint L2P address tables may be kept for different checkpoint versions. For example, a first checkpoint L2P address table may store logical to physical address mappings for first checkpoints of the logical addresses, a second L2P address table may store logical to physical address mappings for second checkpoints of the logical addresses, and so on. In various embodiments, version information in an entry of the checkpoint L2P table may allow identification of the correct logical to physical mapping for a particular checkpointed version of a logical address. In other embodiments, the correct version could be inferred based on the location of the entries of checkpointed logical addresses in one or more checkpoint L2P address tables.

In one embodiment, when a logical address is checkpointed, updates to the data mapped to the logical address are written to a new available physical address in the storage device 106A without overwriting data at the physical address having the previous version of the data mapped to the logical address. In this manner, the previous version of the data mapped to the logical address is maintained at the previous mapped physical address in response to a checkpoint operation. As an example, in the embodiment depicted, both logical address (LA) 1 and LA 2 have been checkpointed. Prior to the checkpointing, the first entry of L2P address table 200 mapped LA 1 to PA 1 and the second entry of L2P address table mapped LA 2 to PA 2. When LA 1 and LA 2 are marked for checkpointing, their respective checkpoint indications 206 are updated. In various embodiments, an entry for a logical address in the checkpoint L2P may be created at the time the logical address is checkpointed and new physical addresses may be allocated for the logical addresses that are checkpointed. In the embodiment depicted, the checkpoint L2P address table 208 includes entries for LA 1 and LA 2. Each entry also includes the physical address that was mapped to the respective logical address at the time of the checkpoint. Thus LA 1 is mapped to PA 1 and LA 2 is mapped to PA 2 in the checkpoint L2P address table. PA 4 is the newly allocated physical address at which data written to LA 1 after the checkpoint is to be stored and PA 5 is the newly allocated physical address at which data written to LA 2 is to be stored (as indicated by the entries of L2P address table 200). Further details of the operations associated with checkpointing will be described in more detail in connection with the other figures below.

Referring again to FIG. 1, in various embodiments, the storage device 106A also includes program control logic 124 which is operable to control the programming sequence performed when data is written to or read from storage media 116. In various embodiments, program control logic 124 may provide the various voltages (or information indicating which voltages should be provided) that are applied to memory cells during the programming and/or reading of data (or perform other operations initiating data reads or writes), perform error correction, and perform other suitable functions (such as receive and process checkpoint related commands).

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 may be located on the same package or chip as storage media 116.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106A may be located on a single chip or on multiple chips. In various embodiments a storage device 106A and a computing host (e.g., CPU 102) may be located on the same circuit board or on the same device and in other embodiments the storage device 106A and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106A may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Suspect application 115 may include software code executed by CPU 102 to perform any suitable function. For example, suspect application 115 may represent an executable file, a browser or other program extension, a script, or other collection of software code. In various embodiments, suspect application 115 may issue instructions to write data to or read data from storage device 106A. Suspect application 115 may include code that is not fully trusted by security application 113.

Security application 113 may include logic providing any suitable security features for computer system 100. In various embodiments, security application 113 may provide functionality to detect and block, remove, or otherwise mitigate the effects of computer viruses, ransomware, keyloggers, trojan horses, spyware, or other harmful software code. In various embodiments, security application 113 may also maintain knowledge of sensitive files and system metadata. In a particular embodiment, security application 113 is executed by CPU 102 and various operations of the security application 113 are managed by operating system 111. For example, the applications may run at a higher level than the operating system and the operating system may be running at a higher privilege level (in various embodiments, the security application 113 may also be running at a higher privilege level than the suspect application 115).

Although, various functions of a security application are discussed throughout this application, in various embodiments other forms of security software may provide similar functionality, such as security software resident in firmware (e.g., Basic Input/Output System (BIOS)), a driver, an operating system, a hypervisor, or in other applications.

Figure 3:
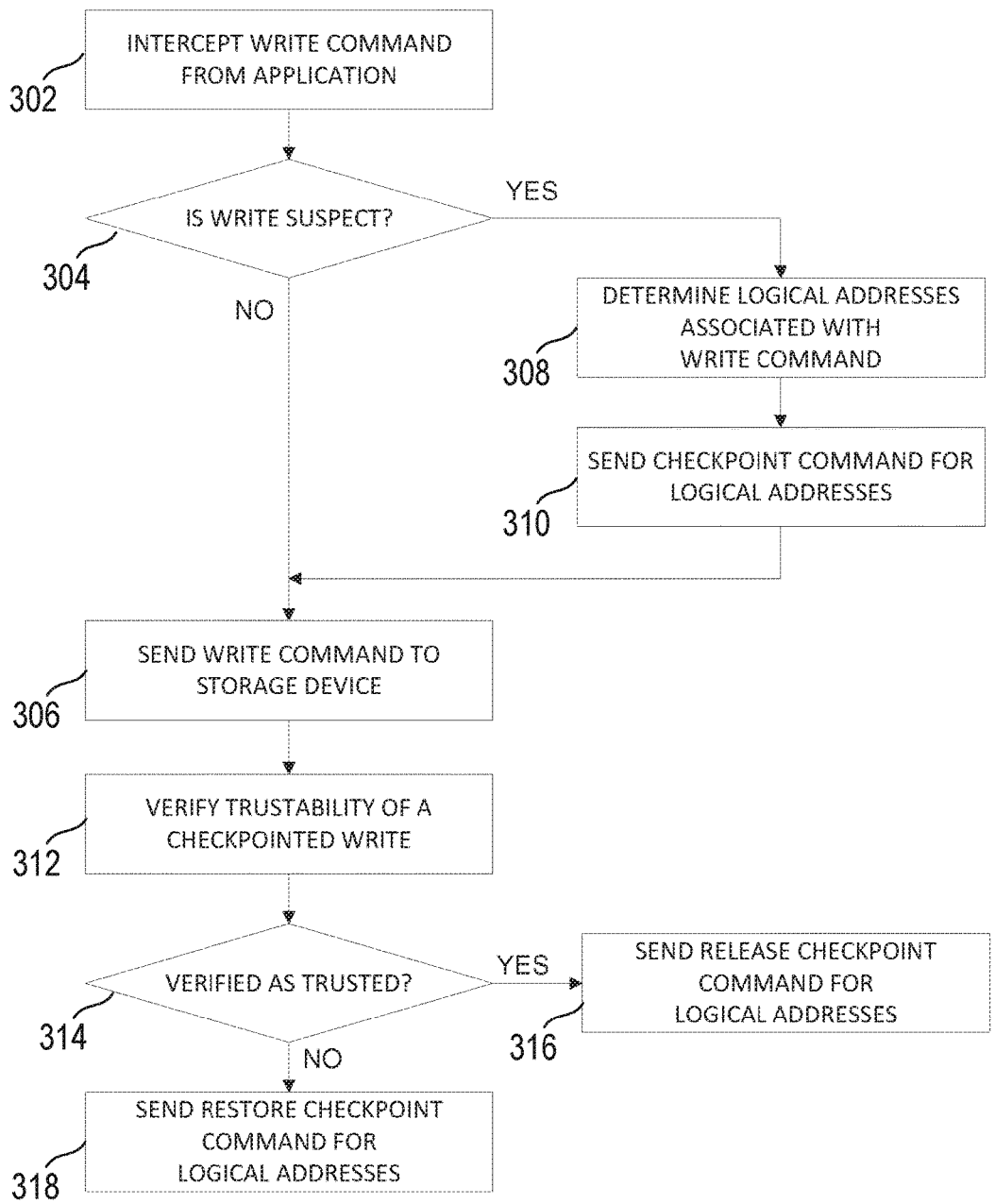
FIG. 3 illustrates an example flow for performing logical address range based checkpointing based on the trustworthiness of data operations in accordance with certain embodiments.

FIG. 3 illustrates an example flow 300 for performing logical address range based checkpointing based on the trustworthiness of data operations in accordance with certain embodiments. Various operations depicted in FIG. 3 may be performed by any suitable logic of a computing host (e.g., CPU 102). In a particular embodiment, the operations of FIG. 3 may be performed by security application 113 or other security software.

At 302, a write command issued by an application is intercepted prior to the write command being sent to storage device 106A. In a particular embodiment, security application 113 may intercept and analyze all write commands that are issued by applications of CPU 102 and destined for storage device 106A. In other embodiments, security application 113 may intercept and analyze a portion of the write commands (e.g., write commands issued from particular applications, write commands to particular files, write commands to particular namespaces or data partitions, or other suitable write commands). In one embodiment, an intercepted write command may be classified by the security application 113 based on a trustworthiness level of the write. As one example, the write command may be classified as untrusted, suspect, or trusted. The security application 113 may take different actions based on this classification. In one embodiment, the security application 113 may block all untrusted writes, allow all trusted rights, and allow suspect writes but checkpoint the data modified by the suspect writes.

At 304, it is determined whether the write is suspect. This determination may be made in any suitable manner. As an example, the determination may be based on the data that the write is modifying. For example, modifications to particular files may be determined as suspect. As another example, modifications to particular namespaces or data partitions (e.g., the drive storing the operating system 111) may be considered as suspect. In various embodiments, the files, namespaces, or data partitions that are to be considered suspect may be defined by the user of the computer system (e.g., if the user specifies that all writes to a particular partition should be checkpointed, the security application 113 may then consider any writes to that partition as suspect). As another example, the determination may be made based on whether an application that issued the write is suspect. If the application is suspect, then any writes issued by the application may be suspect. If the application is not suspect, then any writes issued by the application are not suspect.

Whether an application is suspect may be determined in any suitable manner. In one embodiment, security application 113 may access a whitelist or a blacklist to determine whether an application is suspect. For example, if the application appears on the whitelist, then the application may be considered trusted (while applications not appearing on the whitelist may be considered suspect). As another example, if the application appears on a blacklist, then the application may be considered untrusted while if the application does not appear on the blacklist it may be considered suspect. Security application may maintain lists of trusted, suspect, and untrusted applications. Such lists may apply to applications that are resident on the host (e.g., that have been detected by the security application) or other applications (e.g., from lists published by the author of the security application or available from other sources).

In various embodiments, new applications may be considered as suspect until their trustworthiness is verified. In various embodiments, suspect applications may be allowed to perform I/O operations with storage device 106A. The security application 113 may monitor these I/O operations and determine that one or more of the I/O operations indicate harmful operations (in which case the application may be verified as untrusted). As one example, the security application 113 may detect a harmful signature in data written to the storage device 106A. As another example, the security application 113 may detect suspicious activity (e.g., a series of writes to multiple unrelated files). On the other hand, the security application 113 may determine that the I/O operations performed by the suspect application are legitimate (in which case the application may be verified as trusted). Trustworthiness may be verified in other suitable manners. For example, the security application may receive additional information (e.g., from a user of computer system 100, the publisher of the security application, or other source) identifying an application as trusted or not trusted.

At 304, if the write is not determined as suspect (e.g., because the write was issued by a trusted application or is otherwise determined as trusted), the write command is sent to the storage device 106A. For example, the security application 113 may allow the write to proceed to a filesystem which determines one or more logical addresses indicated by the write and then one or more write commands including these logical addresses and data to be written to these addresses (or identifications of such data) are sent from the CPU to the storage device 106A.

At 304, if the write is determined as suspect, then security application 113 may determine one or more logical addresses associated with the suspect write command. In a particular embodiment, this may involve the security application 113 sending a request to the filesystem including a file and/or a file offset identified in the received write request and receiving one or more corresponding logical addresses from the filesystem, wherein at least a portion of the data associated with each logical address returned by the filesystem is to be modified by the write command.

At 310, a checkpoint command for the identified one or more logical addresses is sent, by the security application 113, to the storage device 106A. The checkpoint command may include (or otherwise identify) the one or more logical addresses. The logical addresses may be specified in any suitable manner. If the checkpoint command is associated with a single logical address, the logical address is included in the checkpoint command. If the checkpoint command is associated with multiple logical addresses, the checkpoint command may include a starting logical address and an ending logical address (or an indication of a number of consecutive logical addresses), effectively requesting checkpointing for all logical addresses within the range of the starting logical address and the ending logical address (or for the number of logical addresses beginning with the starting logical address). As another example, the checkpoint command may include an array with each logical address that is to be checkpointed. In various embodiments, the checkpoint command may explicitly list one or more logical addresses as one or more parameters of the checkpoint command and thus may be distinguished from a checkpoint command that identifies a larger portion of the storage media 116, such as an entire drive.

In various embodiments, the checkpoint command may also include an indication of whether versioning should be applied to the one or more logical addresses specified in the checkpoint command (i.e., should a new checkpoint be created if the logical address is already checkpointed). If this indication is false and the logical addresses are already being checkpointed, then this command will result in no changes being made at the storage device 106A. Otherwise the mapping between the logical addresses and the physical addresses is added to the checkpoint L2P address table, new physical addresses are mapped to the logical addresses in the L2P address table, and the checkpoint indications of the L2P address table are updated. After the checkpoint command is sent (e.g., after a predetermined time period elapses or a confirmation that the checkpoint command has been performed is received from the storage device 106A by the host), the write command is sent at 306, resulting in the writing of the data at the new physical addresses mapped to the logical blocks in the L2P address table.

At some time after the write has been completed (and possibly after other writes have been made to the checkpointed logical addresses or by the suspect application 115) the security application 113 may verify the trustability of the write that initiated the sending of the checkpoint command (the "checkpointed write"). In various embodiments, the trustability of a checkpointed write may be determined in any suitable manner. For example, the trustability may be determined based on input from a user of computer system 100 (e.g., the user may indicate that the state of data written via the checkpointed writes is acceptable to the user). As another example, the trustability of a checkpointed write may be based on the verified trustability of the application that issued the write. If an application is verified as trusted, all writes issued by the application may be verified as trusted. Alternatively if an application is verified as untrusted, all writes issued by the application may be verified as untrusted. In various embodiments, security application 113 may keep a record of logical addresses associated with writes issued by a suspect application and/or other suspect writes logical addresses that have been written to so that upon verification of the trustworthiness of the writes appropriate action may be taken.

If the checkpointed write is verified as trusted at 314, a release checkpoint command for the logical addresses written to via the checkpointed write is sent by the security application at 316. In some embodiments, the release checkpoint command may also include (or otherwise identify) the logical addresses written to via associated checkpointed writes. For example, the release checkpoint command may include (or otherwise identify) the logical addresses of all logical blocks written to by a suspect application. As another example, the release checkpoint command may include (or otherwise identify) the logical addresses of all logical blocks written to a particular file, namespace, or partition since a particular point in time (e.g., since a previous checkpoint of the file, namespace, or partition). The release checkpoint command may result in the checkpointed data being released, that is, the physical addresses that stored the prior version of data (i.e., the data at the time of the checkpoint) are made available for storage of other data and the entries of the checkpoint L2P address table for the logical addresses may be erased or modified to no longer include the mapping to the physical addresses. The checkpoint indications of the entries for the logical addresses in the L2P address table may also be modified (e.g., the indication that the logical address is checkpointed may be cleared or the checkpoint version may be updated).

If the checkpointed write is verified as not trusted at 314, a restore checkpoint command may be sent by the security application 113 for the logical addresses (of the checkpointed write or associated writes) at 318. The restore checkpoint command may include (or otherwise identify) the logical addresses to be restored. The restore checkpoint command may result in the appropriate physical addresses in the checkpoint L2P being rewritten into the L2P address table, such that the logical addresses are again mapped to the data as it existed when the checkpoint was created. In a particular embodiment, the security application may delay the sending of the checkpoint command, e.g., if the security application would like to monitor the activity of the untrusted application and determines that the writes aren't causing any immediate harm.

The flow described in FIG. 3 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 3 may be repeated, combined, modified or deleted where appropriate. As one example, the checkpoint command may be combined with the write command. The combined command may then include logical addresses to checkpoint as well as data (or indications of data) to write to those logical addresses after the logical addresses are checkpointed. The combined command may also include an indication of whether versioning should be applied to the one or more logical addresses specified in the checkpoint command. Additionally, operations may be performed in any suitable order without departing from the scope of particular embodiments.

Figure 4:
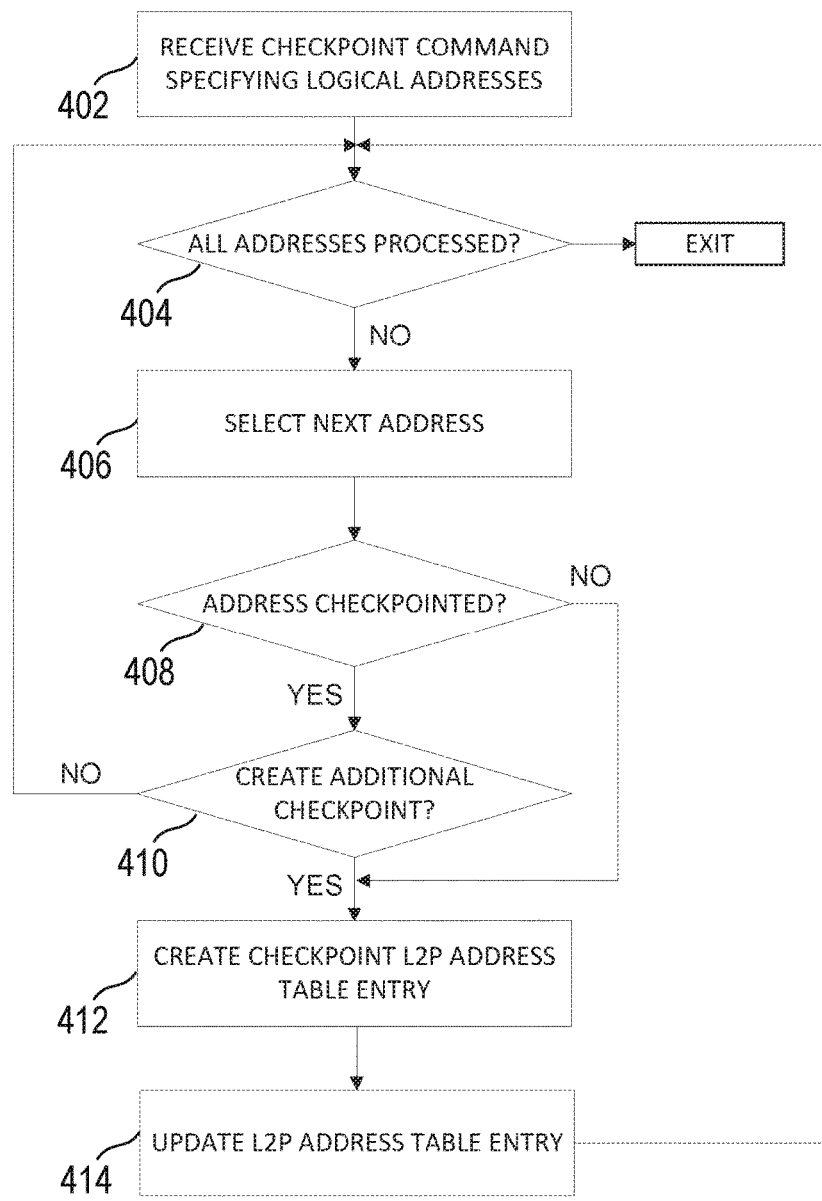
FIG. 4 illustrates an example flow for processing, by a storage device, a checkpoint command received from a computing host in accordance with certain embodiments.

FIG. 4 depicts an example flow 400 for processing, by a storage device 106A, a checkpoint command received from a computing host in accordance with certain embodiments. Various operations of the flow may be performed by any suitable logic of the storage device 106A, such as program control logic 124 and/or address translation engine 120.

At 402, a checkpoint command specifying one or more logical addresses is received from a computing host. At 404, a determination is made as to whether there are logical addresses of the checkpoint command that have not yet been processed (during the first iteration, the command may be analyzed to make sure that the checkpoint command specifies at least one address). At 406, the next logical address specified in the command is selected. At 408, a determination is made as to whether the selected logical address is already checkpointed. For example, a checkpoint indication associated with the logical address in the L2P address table may indicate whether the logical address is checkpointed. If the logical address is not checkpointed, then a checkpoint L2P address table entry is created and the logical address is mapped in the entry to the physical address currently associated with the logical address in the L2P address table entry for the logical address. The L2P address table entry is then updated at 414. The updating may include setting a checkpoint indication of the entry as well as allocating a new physical address to store data associated with the logical address and overwriting the current physical address in the L2P address table entry with the new physical address.

If the logical address is already checkpointed as determined at 408, then a determination of whether an additional checkpoint should be created is made at 410. As one example, the checkpoint command may specify whether an additional checkpoint should be created (e.g., using a one bit indicator). If a new checkpoint is not to be created, the flow may return to 404 to process the next logical address. If an additional checkpoint is to be created, then an entry for the additional checkpoint is created in the checkpoint L2P address table (or an additional checkpoint L2P address table) at 412. The entry may include the logical address and the current physical address associated with the logical address. The L2P address table entry is then updated at 414. The updating may include modifying a checkpoint indication of the entry to include checkpoint version information (indicative of the location of the checkpoint L2P entry just created) as well as allocating a new physical address to store data associated with the logical address and overwriting the current physical address in the L2P address table entry with the new physical address. The flow then returns to 404 to process the next logical address of the checkpoint command. When it is determined at 404 that all addresses have been processed, the flow ends. In some embodiments, the storage device 106A may then send a checkpoint completion message to the host and the host may then send a write command to write data to the logical blocks that were checkpointed.

The flow described in FIG. 4 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 4 may be repeated, combined, modified or deleted where appropriate. Additionally, operations may be performed in any suitable order without departing from the scope of particular embodiments.

Figure 5:
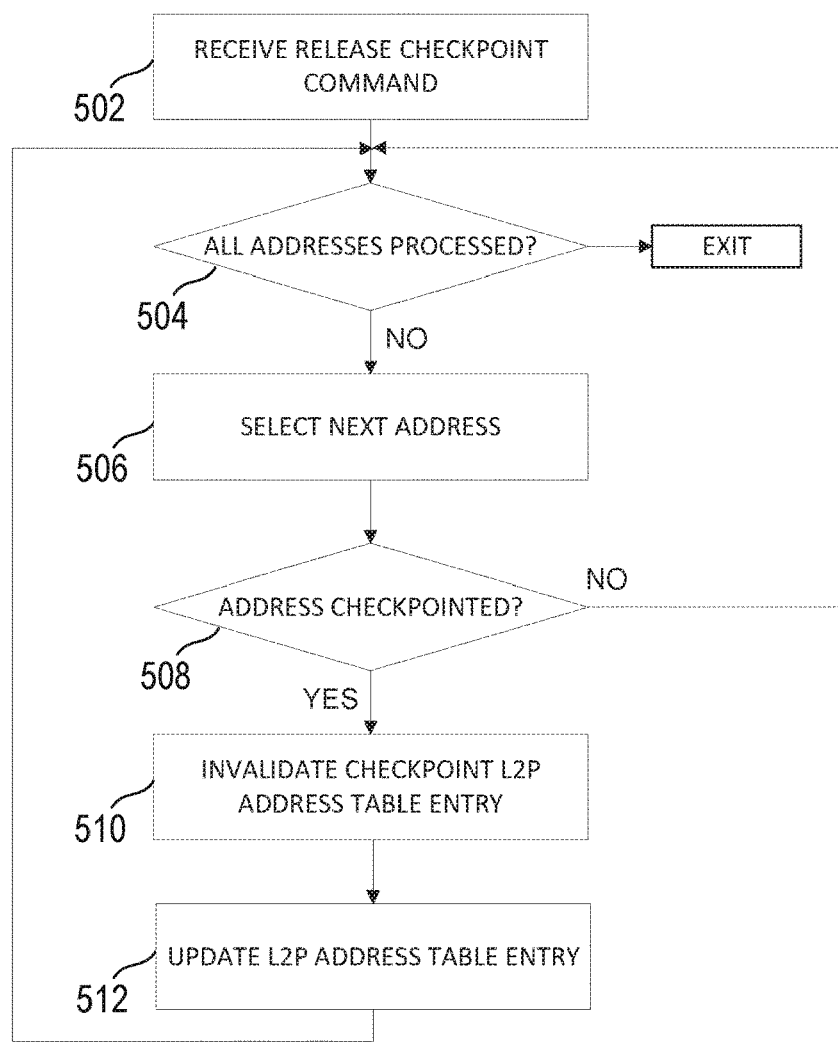
FIG. 5 illustrates an example flow for processing, by a storage device, a release checkpoint command received from a computing host in accordance with certain embodiments.

FIG. 5 depicts an example flow 500 for processing, by a storage device 106A, a release checkpoint command received from a computing host in accordance with certain embodiments. This command may be used by the security application 113 to release the checkpoint on logical addresses specified in the release checkpoint command, e.g., after verification that the data stored in the logical addresses have not been compromised by malware. The storage device may discard older checkpointed data associated with these logical addresses and stop checkpointing these logical addresses.

At 502, a release checkpoint command is received. The release checkpoint command may specify one or more logical addresses. The addresses may be specified in any suitable manner. In a particular embodiment, the addresses are specified using a format that is the same as the format used to specify the addresses of the checkpoint command.

At 504, a determination is made whether there are logical addresses of the release checkpoint command that have not yet been processed (during the first iteration, the command may be analyzed to make sure that the release checkpoint command specifies at least one address). At 506, the next logical address specified in the release checkpoint command is selected. At 508, a determination is made as to whether the selected logical address is checkpointed. For example, a checkpoint indication stored in associated with the logical address in the L2P address table may indicate whether the logical address is checkpointed. If the logical address is not checkpointed, the flow returns to 504.

If the logical address is checkpointed, the checkpoint L2P address table entry corresponding to the logical address is invalidated at 510. The checkpoint L2P address table entry may be invalidated in any suitable manner, such as by deleting or modifying the physical address stored in the entry. The invalidation may result in the physical address eventually being reclaimed in order to store other data. The L2P address table entry including the logic address is updated at 512. This may include clearing the checkpoint indication of the L2P entry (or updating the checkpoint version if multiple checkpoints are kept). The flow then returns to 504. If a determination is made at 504 that all addresses have been processed, the flow ends.

The flow described in FIG. 5 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 5 may be repeated, combined, modified or deleted where appropriate. Additionally, operations may be performed in any suitable order without departing from the scope of particular embodiments.

Figure 6:
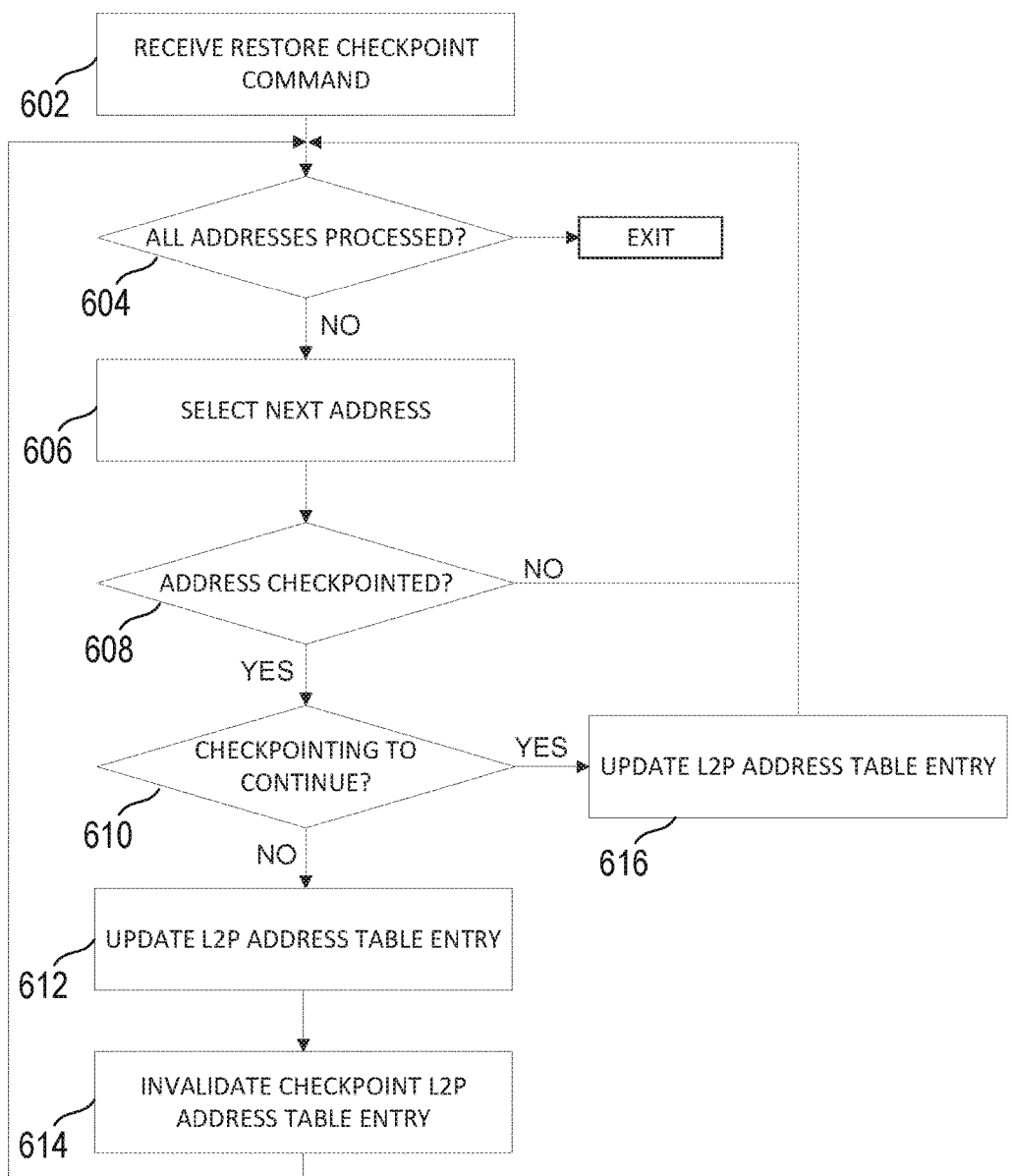
FIG. 6 illustrates an example flow for processing, by a storage device, a restore checkpoint command received from a computing host in accordance with certain embodiments.

FIG. 6 depicts an example flow 600 for processing, by a storage device 106A, a restore checkpoint command received from a computing host in accordance with certain embodiments. In various embodiment, the restore checkpoint command may be issued by the security application to "undo" the writes to the specified checkpointed logical addresses once it has been determined that the data at the logical addresses has been compromised and should be reverted back to its state at the checkpoint. The storage device internally restores the data at the logical addresses to their checkpointed state. In various embodiments, checkpointing continues by default or checkpointing stops by default, though some embodiments may provide a parameter in the restore checkpoint command to cause checkpointing to continue or stop after the restore command is executed.

At 602, a restore checkpoint command is received. The restore checkpoint command may specify one or more logical addresses. The addresses may be specified in any suitable manner. In a particular embodiment, the addresses are specified using a format that is the same as the format used to specify the addresses in the checkpoint command.

At 604, a determination is made as to whether there are logical addresses of the restore checkpoint command that have not yet been processed (during the first iteration, the command may be analyzed to make sure that the restore checkpoint command includes at least one address). At 606, the next logical address specified in the restore checkpoint command is selected. At 608, a determination is made as to whether the selected logical address is checkpointed. For example, a checkpoint indication stored in associated with the logical address in the L2P address table may indicate whether the logical address is checkpointed. If the logical address is not checkpointed, the flow returns to 604.

If the logical address is checkpointed, at 610 a determination is made as to whether checkpointing is to continue. In various embodiments, the restore checkpoint command may include an indication of whether checkpointing is to continue after the checkpoint is restored. In other embodiments, the storage device 106A may be configured to either stop checkpointing after the restore checkpoint command is performed or continue checkpointing after the restore checkpoint command is performed by default.

If checkpointing is not to continue, the L2P address table entry for the logical address is updated at 612. The updating may include writing the physical address that is mapped to the logical address in the corresponding checkpoint L2P address table entry over the physical address of the L2P address table entry (accordingly the logical address now maps to the data as it was at the time of the checkpoint). At 614, the checkpoint L2P address table entry is invalidated and the checkpoint indicator of the L2P address table entry is cleared (or the checkpoint version is updated). If it is determined at 610 that checkpointing is to continue, the L2P address table entry for the logical address may be updated at 616, e.g., by writing the physical address that is mapped to the logical address in the corresponding checkpoint L2P address table entry over the physical address of the L2P address table entry. When a write is performed targeting this logical address, a new physical address may be allocated for the L2P address table entry to store the data referenced by the write command. In an alternative embodiment, if checkpointing of the logical address is to continue, the data stored at the physical address of the checkpoint L2P address table entry is copied to the physical address of the L2P address table at 616 and the table entries are unmodified (since the table entries are already set up for checkpointing). The flow then returns to 604. If a determination is made at 604 that all addresses have been processed, the flow ends.

The flow described in FIG. 6 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments.

In various embodiments, when a computing host issues a restore checkpoint command, it may also perform one or more operations to restore the correct filesystem mapping with respect to the logical addresses that were restored. In one embodiment, when logical blocks of a file are restored via the restore checkpoint command, the security application 113 may read the checkpointed version of metadata of the file and communicate with the filesystem to restore the metadata. Any suitable metadata may be restored, such as file sizes, data locations (i.e., logical addresses), permissions, timestamps, or other information associated with the files stored at logical addresses that were checkpointed. In another embodiment, the security application 113 may read the checkpointed file, write a new copy of the checkpointed file, instruct the file-system to delete the current version of the file, and assign the original name to the new file.

Figure 7:
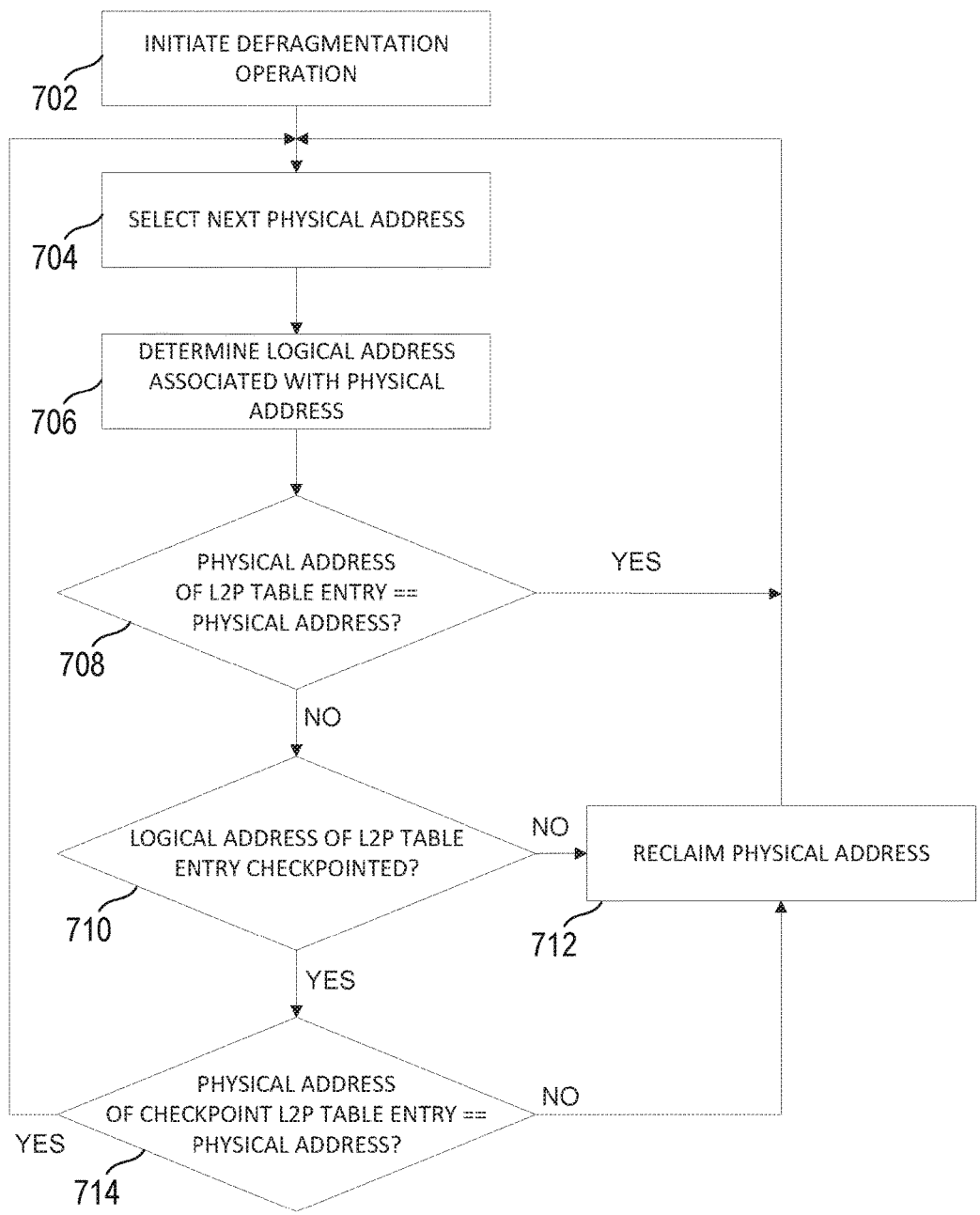
FIG. 7 illustrates an example flow for performing a defragmentation operation by a storage device in accordance with certain embodiments.

FIG. 7 depicts an example flow 700 for performing a defragmentation operation by a storage device 106A in accordance with certain embodiments. In a particular embodiment, the defragmentation operation is initiated by the storage device 106A independent of any instructions from the computing host. In another embodiment, the defragmentation operation may be initiated in response to receiving a defragmentation command from the computing host. The defragmentation operation is performed by the storage device 106A to reclaim physical addresses that no longer store valid data so that the addresses may be remapped to other logical blocks and used to store new data.

The defragmentation operation is initiated at 702. The defragmentation operation may iterate through multiple physical addresses and determine whether the physical addresses may be reclaimed. At 704, the next physical address is selected. At 706 a logical address associated with the physical address is determined. The logical address associated with the physical address may be determined in any suitable manner. For example, the logical address may be determined from page data having the physical address, a journal, or other metadata for the storage media 116.

At 708, the L2P address table entry that includes the logical address is accessed. If the physical address of the L2P address table entry is the same as the physical address selected at 704, then valid data is stored at that physical address and that physical address is not subject to being reclaimed. Accordingly, the flow loops back to 704.

At 708, if the physical addresses do not match, then the L2P address table entry is checked at 710 to determine whether the logical address is checkpointed. If the logical address is not checkpointed (indicating that the selected physical address is not being used to store valid data), then the selected physical address is reclaimed at 712 and the flow returns to 704.

If it is determined at 710 that the logical address is checkpointed, then the corresponding checkpoint L2P address table entry is accessed and a determination is made as to whether the selected physical address is equal to the physical address of the checkpoint L2P address table entry. If the addresses are equal, then the data at the physical address is valid and not subject to reclamation and the flow returns to 704. If the addresses are not equal, the physical address is reclaimed at 712 and the flow returns to 704.

The flow described in FIG. 7 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 7 may be repeated, combined, modified or deleted where appropriate. Additionally, operations may be performed in any suitable order without departing from the scope of particular embodiments.

In various embodiments, the checkpoint L2P address table may be kept in an incremental (delta) manner (i.e., entries may be added to the checkpoint L2P address table as logical blocks are checkpointed), multiple versions of the checkpoint L2P address table may be kept (for example, a first checkpoint L2P address table may store mappings for first checkpoints of logical addresses, a second checkpoint L2P address table may store mappings for second checkpoints of logical addresses, and so on), or the versioning information may be implemented as an L2P address table extension or a separate array. In various embodiments, both the L2P and checkpoint L2P address tables are stored in a manner that prevents loss of data during a power failure.

In various embodiments, encryption technologies may be used by the storage device 106A to authenticate checkpointing related communications (e.g., the checkpoint command, release checkpoint command, and restore checkpoint command) from the host system to prevent malware from issuing storage device checkpointing commands to corrupt the checkpointed data in the storage device. In various embodiments, a secure channel for checkpointing communications may be established over the same physical channel used by the host system to send standard write and read commands. Administrative access control may also be used to authenticate check pointing related communication from the host system to the storage device. In a particular embodiment, the storage device 106A may maintain a security key that is used to authenticate the host system before checkpoint commands are processed. In a particular embodiment, the key may be generated dynamically during a key negotiation process between the storage device and the computing host. The key may be part of any security technique, such as host authentication mechanism, a shared key, a passphrase or cookie, a public key used to decrypt messages from the host, or other mechanism. In a particular embodiment, the computing host may maintain the key in a trusted execution environment, such as an environment utilizing Intel's Software Guard Extensions (SGX) or other similar environment.

Although various embodiments have been described with respect to particular storage device types (e.g., solid state drives), the teachings of the present disclosure may apply to any storage device in which a logical address to physical address mapping scheme may be implemented. For example, teachings of the present disclosure may be used with hard disk drives, NVDIMMs, or other suitable storage devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106A, system memory device 107, storage media 116, storage device controller 118, address translation engine 120, program control logic 124, operating system 111, security application 113, suspect application 115, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, a system comprises a processor to, in response to a determination that a write command is suspect, identify a logical address associated with the write command; and send a checkpoint command identifying the logical address to a storage device to preserve data stored in the storage device at a physical address associated with the logical address.

In an embodiment, the processor is further to send the write command to the storage device after the checkpoint command has been sent. In an embodiment, the processor is further to identify a range of logical addresses associated with the write command and wherein the checkpoint command identifies the range of logical addresses. In an embodiment, the checkpoint command is a combined checkpoint command and write command and includes an identification of data to be written to the logical address. In an embodiment, the processor is further to send a release checkpoint command identifying the logical address to the storage device in response to a determination that the write command is trusted. In an embodiment, the release checkpoint command identifies a range of logical addresses associated with the write command. In an embodiment, the processor is further to send a restore checkpoint command identifying the logical address to the storage device in response to a determination that the write command is not trusted. In an embodiment, the restore checkpoint identifies a range of logical addresses associated with the write command. In an embodiment, identifying the logical address associated with the write command comprises determining, by a filesystem, the logical address based on a file and offset identified in the write command. In an embodiment, the determination that the write command is suspect is based on a determination that an application that issued the write command is suspect.

In at least one embodiment, a method comprises, in response to a determination that a write command is suspect, identifying a logical address associated with the write command; and sending a checkpoint command identifying the logical address to a storage device to preserve data stored in the storage device at a physical address associated with the logical address.

In an embodiment, the method further comprises sending the write command to the storage device after the checkpoint command has been sent. In an embodiment, the method further comprises identifying a range of logical addresses associated with the write command, and wherein the checkpoint command identifies the range of logical addresses. In an embodiment, the checkpoint command is a combined checkpoint command and write command and includes an identification of data to be written to the logical address. In an embodiment, the method further comprises sending a release checkpoint command identifying the logical address to the storage device in response to a determination that the write command is trusted. In an embodiment, the release checkpoint command identifies a range of logical addresses associated with the write command. In an embodiment, the method further comprises sending a restore checkpoint command identifying the logical address to the storage device in response to a determination that the write command is not trusted. In an embodiment, the restore checkpoint identifies a range of logical addresses associated with the write command. In an embodiment, identifying the logical address associated with the write command comprises determining, by a filesystem, the logical address based on a file and offset identified in the write command. In an embodiment, the determination that the write command is suspect is based on a determination that an application that issued the write command is suspect.

In at least one embodiment, a non-transitory machine readable storage medium includes instructions stored thereon, the instructions when executed by a machine to cause the machine to, in response to a determination that a write command is suspect, identify a logical address associated with the write command; and send a checkpoint command identifying the logical address to a storage device to preserve data stored in the storage device at a physical address associated with the logical address.

In an embodiment, the instructions when executed by the machine to further cause the machine to send the write command to the storage device after the checkpoint command has been sent. In an embodiment, the checkpoint command is a combined checkpoint command and write command and includes an identification of data to be written to the logical address. In an embodiment, the instructions when executed by the machine to further cause the machine to send a release checkpoint command identifying the logical address to the storage device in response to a determination that the write command is trusted. In an embodiment, the instructions when executed by the machine to further cause the machine to send a restore checkpoint command identifying the logical address to the storage device in response to a determination that the write command is not trusted. In an embodiment, identifying the logical address associated with the write command comprises determining by a filesystem the logical address based on a file and offset identified in the write command. In an embodiment, the determination that the write command is suspect is based on a determination that an application that issued the write command is suspect.

In at least one embodiment, an apparatus comprises a storage device controller of a solid state drive, the storage device controller to receive a checkpoint command identifying a logical address to checkpoint; and in response to the checkpoint command mark the logical address as checkpointed and store a first mapping of the logical address to a first physical address, wherein data associated with the logical address is stored at the first physical address prior to the receipt of the checkpoint command; and map the logical address to a second physical address.

In an embodiment, the storage device controller is further to, in response to a restore checkpoint command that identifies the logical address, map the logical address back to the first physical address. In an embodiment, the storage device controller is further to, in response to the restore checkpoint command that identifies the logical address, mark the logical address as not checkpointed. In an embodiment, the storage device controller is further to, in response to a release checkpoint command that identifies the logical address, mark the logical address as not checkpointed and allow the first physical address to be reclaimed to be mapped to a different logical address. In an embodiment, the checkpoint command includes a range of logical addresses identified at least in part by the logical address. In an embodiment, the checkpoint command further includes an identification of data to be written to the logical address, and the storage device controller is further to write the data to the second physical address. In an embodiment, the storage controller is further to, in response to receiving a write command identifying the logical address, write data to the second physical address.

In at least one embodiment, a system comprises means to, in response to a determination that a write command is suspect, identify a logical address associated with the write command; and send a checkpoint command identifying the logical address to a storage device to preserve data stored in the storage device at a physical address associated with the logical address.

In an embodiment, the system further comprises means to send a release checkpoint command identifying the logical address to the storage device in response to a determination that the write command is trusted. In an embodiment, the system further comprises means to send a restore checkpoint command identifying the logical address to the storage device in response to a determination that the write command is not trusted.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
 a processor to:
  identify a logical address targeted by a write command;
  in response to a determination that the write command is suspect, send a checkpoint command identifying the targeted logical address to a storage device to preserve data stored in the storage device at a physical address corresponding to the logical address; and
  in response to a determination that the write command is trusted, send a release checkpoint command identifying the targeted logical address to the storage device.

2. The system of claim 1, the processor further to send the write command to the storage device after the checkpoint command has been sent.

3. The system of claim 1, wherein the checkpoint command is a combined checkpoint command and write command and includes an identification of data to be written to the logical address.

4. The system of claim 1, the processor further to send a restore checkpoint command identifying the targeted logical address to the storage device in response to a determination that the write command is not trusted.

5. The system of claim 1, wherein identifying the logical address targeted by the write command comprises determining, by a filesystem, the logical address based on a file and offset identified in the write command.

6. The system of claim 1, wherein the determination that the write command is suspect is based on a determination that an application that issued the write command is suspect.

7. The system of claim 1, further comprising one or more of: a battery communicatively coupled to the processor, a display communicatively coupled to the processor, or a network interface communicatively coupled to the processor.

8. A non-transitory machine readable storage medium having instructions stored thereon, the instructions when executed by a machine to cause the machine to:
 identify a logical address targeted by a write command;
 in response to a determination that the write command is suspect, send a checkpoint command identifying the targeted logical address to a storage device to preserve data stored in the storage device at a physical address corresponding to the logical address; and
 in response to a determination that the write command is trusted, send a release checkpoint command identifying the targeted logical address to the storage device.

9. The medium of claim 8, the instructions when executed by the machine to further cause the machine to send the write command to the storage device after the checkpoint command has been sent.

10. The medium of claim 8, wherein the checkpoint command is a combined checkpoint command and write command and includes an identification of data to be written to the logical address.

11. The medium of claim 8, the instructions when executed by the machine to further cause the machine to send a restore checkpoint command identifying the targeted logical address to the storage device in response to a determination that the write command is not trusted.

12. The medium of claim 8, wherein identifying the logical address targeted by the write command comprises determining by a filesystem the logical address based on a file and offset identified in the write command.

13. The medium of claim 8, wherein the determination that the write command is suspect is based on a determination that an application that issued the write command is suspect.

14. An apparatus comprising:
 a storage device controller of a solid state drive, the storage device controller to:
  receive a checkpoint command including a logical address to checkpoint;
  perform the checkpoint command by:
   marking the logical address as checkpointed and store a first mapping of the logical address to a first physical address, wherein data associated with the logical address is stored at the first physical address prior to the receipt of the checkpoint command; and
   mapping the logical address to a second physical address; and
  in response to a restore checkpoint command that identifies the logical address, map the logical address back to the first physical address, wherein mapping the logical address back to the first physical address comprises writing the first physical address over the second physical address in a logical to physical address table.

15. The apparatus of claim 14, the storage device controller further to, in response to the restore checkpoint command that identifies the logical address, mark the logical address as not checkpointed.

16. The apparatus of claim 14, the storage device controller further to, in response to a release checkpoint command that identifies the logical address, mark the logical address as not checkpointed and allow the first physical address to be reclaimed to be mapped to a different logical address.

17. The apparatus of claim 14, wherein the checkpoint command includes a range of logical addresses identified at least in part by the logical address.

18. The apparatus of claim 14, wherein the checkpoint command further includes an identification of data to be written to the logical address, and the storage device controller is further to write the data to the second physical address.

19. The apparatus of claim 14, wherein the storage controller is further to, in response to receiving a write command identifying the logical address, write data to the second physical address.

* * * * *